United States Patent
Zhu et al.

(10) Patent No.: US 9,173,097 B2
(45) Date of Patent: Oct. 27, 2015

(54) TECHNIQUES FOR AUTO-AUTHENTICATION

(75) Inventors: Jing Zhu, Portland, OR (US); Mats Angerstam, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 107 days.

(21) Appl. No.: 13/997,234

(22) PCT Filed: Dec. 21, 2011

(86) PCT No.: PCT/US2011/066566
§ 371 (c)(1),
(2), (4) Date: Jun. 22, 2013

(87) PCT Pub. No.: WO2013/095451
PCT Pub. Date: Jun. 27, 2013

(65) Prior Publication Data
US 2013/0326587 A1 Dec. 5, 2013

(51) Int. Cl.
*H04L 9/32* (2006.01)
*H04W 12/06* (2009.01)
*H04W 88/02* (2009.01)
*H04W 84/12* (2009.01)

(52) U.S. Cl.
CPC .............. *H04W 12/06* (2013.01); *H04W 88/02* (2013.01); *H04W 84/12* (2013.01)

(58) Field of Classification Search
CPC ....... H04L 63/08; H04L 47/14; H04W 12/06; H04W 12/08; H04W 88/02; H04W 84/12; G06F 21/31; G06F 21/35; G06F 21/43

USPC .......................... 726/2–7; 713/168; 380/270; 709/223–225
See application file for complete search history.

(56) References Cited

U.S. PATENT DOCUMENTS

| | | | |
|---|---|---|---|
| 7,103,661 B2* | 9/2006 | Klein | 709/225 |
| 7,296,152 B1* | 11/2007 | MacPherson et al. | 713/168 |
| 7,801,517 B2* | 9/2010 | Silvestri | 455/423 |
| 8,560,653 B2* | 10/2013 | Herrod et al. | 709/223 |
| 2003/0120767 A1 | 6/2003 | Morimoto | |
| 2005/0177515 A1* | 8/2005 | Kalavade et al. | 705/52 |

FOREIGN PATENT DOCUMENTS

JP     2006-020088 A     1/2006

OTHER PUBLICATIONS

International Search Report and Written Opinion, Mailed Date: Aug. 14, 2012, Application No. PCT/US2011/066566, Filed Date: Dec. 21, 2011, pp. 9.

* cited by examiner

*Primary Examiner* — Hosuk Song
(74) *Attorney, Agent, or Firm* — Kacvinsky Daisak Bluni PLLC

(57) ABSTRACT

Techniques to automatically authenticate may include determining that a mobile device is on a wireless local area network. An network access identification for the wireless local area network may be determined. The mobile device may be automatically authenticated on the wireless local area network based on information associated with the network access identification. Other embodiments are described and claimed.

30 Claims, 11 Drawing Sheets

| Field | Example #1 | Example #2 | Example #3 | Example #4 |
|---|---|---|---|---|
| 510 Network Access Identification | 1 | 2 | 3 | 4 |
| 505 Set Service Identification | attwifi | attwifi | attwifi | attwifi |
| 515 Key Word | McDonald's© | FedEx© | Barnes and Nobles© | Starbucks© |
| 520 Matching Threshold | 2 | 1 | 1 | 5 |
| 525 Authentication Type Identification | 1 | 2 | 2 | 1 |
| 530 Authentication Parameter #1 | 9 | 2 | 2 | 0 |
| 535 Authentication Parameter #2 | aupAgree | AUPConfirmation | AUPConfirmed | aupAgree |
| 540 Authentication Status | 0 | 0 | 0 | 0 |

*FIG. 5*

TECHNIQUES FOR AUTO-AUTHENTICATION

BACKGROUND

Users of devices such as, smart phones, laptops, tablets and netbooks are often able to experience always on, always connected (AOAC) with wireless wide area networks. The AOAC experience allows a device to be always updated. The device may download items, such as emails in an e-mail application and/or social updates in a social application, when the device is unattended by a user. As a result, the applications running on the device remain current even when the device is unattended.

A device may offload internet connectivity from a wireless wide area network to a wireless fidelity (WiFi) network to ease congestion on the wireless wide area network. Additionally, allowing a device to offload may save a user money as a user often pays a service for a certain amount of bandwidth space on a wireless wide area network. Devices frequently offload to WiFi as free WiFi access points are increasingly being provided for public internet access. Yet, connecting to a WiFi access point is often not a seamless operation as it requires some level of user interaction.

Typically, in order for a device to connect to a WiFi access point, a user must open the browser and go through one or two web pages to accept terms and conditions for their device before the device can access the internet. For example, a user often must accept terms and conditions listed on a webpage prior to the user's device connecting to a WiFi access point. This manual authentication is not very convenient to a user. Additionally, having to authenticate with a WiFi access point prevents users from experiencing AOAC when the device is unattended. It is with respect to these and other considerations that the present improvements are needed.

BRIEF DESCRIPTION OF THE DRAWINGS

FIG. 5 discloses a chart with information used in knowledge based authentication.

DETAILED DESCRIPTION

Figure 1:
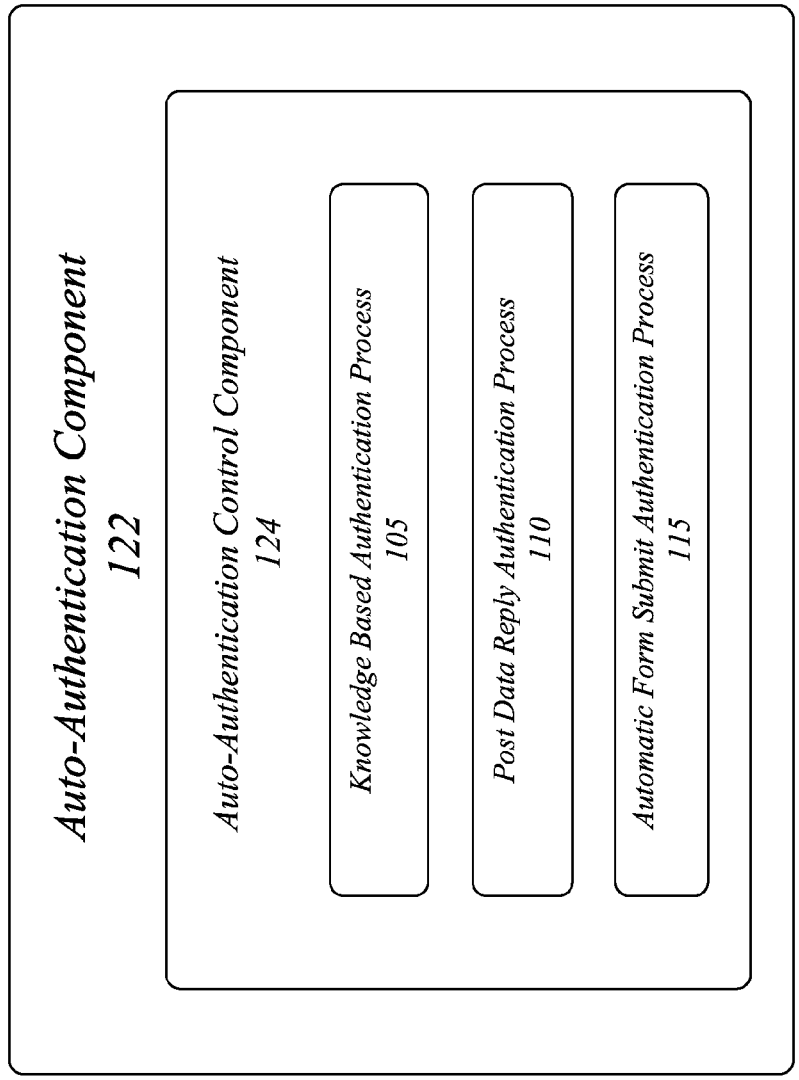
FIG. 1 illustrates a block diagram of an auto-authentication system.

Various embodiments are directed to techniques for automatic authentication. In an embodiment, it may be determined that that a mobile device is on a wireless local area network, such as, but not limited to, Wireless Fidelity (WiFi). A network access identification for the wireless local area network may be determined. Based on the network access identification, information for authentication may be obtained. The mobile device may automatically authenticate on the wireless local area network using the information. By automatically authenticating, a mobile device may be always connected to the internet and a user of the mobile device may experience AOAC. As a result, the embodiments can improve affordability, scalability, modularity, extendibility, or interoperability for an operator, device or network.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a block diagram for an auto-authentication system 100. In one embodiment, the system 100 may comprise a computer-implemented auto-authentication system 100 having one or more software applications and/or components. Although the auto-authentication system 100 shown in FIG. 1 has a limited number of elements in a certain topology, it may be appreciated that the auto-authentication system 100 may include more or less elements in alternate topologies as desired for a given implementation.

In an embodiment, the auto-authentication system 100 may be part of, added and/or integrated into a connection manager software stack. In an embodiment, the auto-authentication system 100 may include an auto-authentication component 122. The auto-authentication component 122 may be an auto-authentication manager. In an embodiment, the authentication component may be used to determine when authentication can occur. The auto-authentication component 122 may interact with a host driver to determine that an access point is available for authentication. In an embodiment, the auto-authentication component 122 may use the internet to connect to one or more servers associated with the access point as discussed in FIG. 3.

In an embodiment, an auto-authentication component 122 may include an auto-authentication control component 124. The auto-authentication control component 124 may implement a variety of processes in order to automatically authenticate with an access point. In an embodiment, the auto-authentication control component 124 may implement a knowledge based authentication process 105, a post data reply authentication process 110, and an automatic form submit authentication process 115.

In an embodiment, the auto-authentication control component 122 may implement a knowledge based authentication process 105. The knowledge based authentication process may use a priori knowledge of a network access identification associated with one or more access points of a wireless local area network to automate the authentication process. In an embodiment, the knowledge based authentication process may allow the device to automatically authenticate with a wireless device based on information stored by the auto-authentication component 122. In an embodiment, the device may store the information in a database which may be accessed by the auto-authentication control component 124. In an embodiment, the auto-authentication component 122 may receive the information from a server. A backend server may provide updates to the database. The updates may occur periodically and/or based on information from the auto-authentication component 122.

In an embodiment, the auto-authentication control component 124 may implement a post data reply authentication process 110. The post data reply authentication process 110 may require a user to manually authenticate with an access point associated with a network access identification when a user connects to the access point in the wireless local area network for the first time. In an embodiment, the wireless local area network may include multiple access points. The network access identification may identify the access points in the wireless local area network. On subsequent connections to an access point in the wireless local area network, the post data reply authentication process 110 may automatically authenticate with the access point with the same network access identification. In an embodiment, the post data reply authentication process 110 may automatically authenticate a device using a combination of previously cached post data and new data.

In an embodiment, the auto-authentication control component 124 may implement an automatic form submit process 115. In an embodiment, the automatic form submit process may be used when the knowledge based authentication process 105 and the post data reply process 110 are unable authenticate a device. In an embodiment, the automatic form submit process may submit for authentication only the data on a webpage. For example, the automatic form submit process may authenticate a device when the landing page of a captive portal includes all post data to be submitted for authentication.

Figure 2:
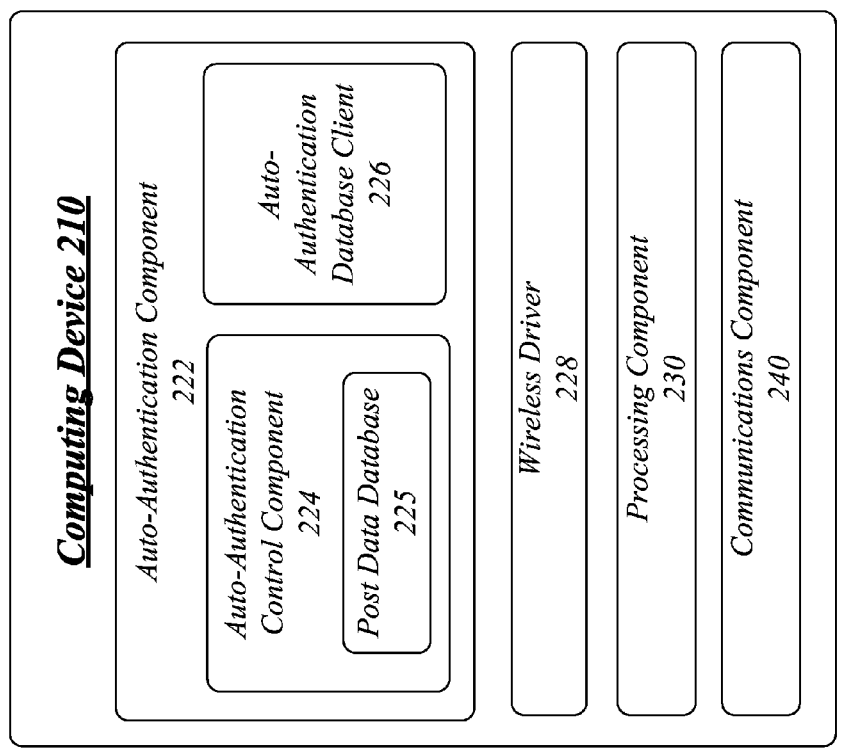
FIG. 2 illustrates a block diagram of a system.

FIG. 2 illustrates a block diagram of a system 200. The system 200 may implement some or all of the structure and/or operations for the system 100 in a single computing entity, such as entirely within a single computing device 210. A computing device 210 may include, but is not limited to, a mobile device. Examples of a mobile device may include, without limitation, a personal digital assistant, a mobile computing device, a smart phone, a cellular telephone, a handset, a one-way pager, a two-way pager, a messaging device, a personal computer (PC), a laptop computer, a notebook computer, a handheld computer and a tablet computer.

For example, the computing device 210 may include an auto-authentication component 222. The auto-authentication component 222 may include an auto-authentication control component 224 and an auto-authentication database client 226.

As discussed above, the auto-authentication control component 224 may implement the knowledge based authentication process, the post data reply authentication process and the automatic form submit authentication process described above. In an embodiment, the auto-authentication control component 224 may include a post data database 225. In an embodiment, the post data database 225 may be internal to the auto-authentication control component 224. The post data database 225 may include information stored by the auto-authentication control component 224 during the first time a user manually authenticates using the post data reply authentication process 110. In an embodiment, the post data database 225 may include information for a client system 210 to automatically connect to a wireless local area network. The client system 210 may automatically connect to a wireless local area network using post data associated with a unique set service identification.

In an embodiment, the auto-authentication database client 226 may be external to the auto-authentication control component 224. In an embodiment, the auto-authentication database client 226 may include information for a mobile device to automatically connect to a wireless local area network using a unique set service identification. In an embodiment, based on information associated with a unique set service identification, the auto-authentication control component 222 may automatically authenticate with the wireless local area network using the knowledge based authentication process 105.

The computing device 210 may include a wireless driver 228. A wireless driver 228 may include connection software to enable a mobile device to connect the internet. In an embodiment, the wireless driver 228 may communicate with the auto-authentication component 220 so that the auto-authentication component 220 may automatically authenticate the computing device 210 on a wireless local area network determined by the wireless driver 228.

The computing device 210 may execute processing operations or logic for the system 100 using a processing component 230. The processing component 230 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing device 210 may execute communications operations or logic for the system 100 using a communications component 240. The communications component 240 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 240 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 215 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media 215.

The computing device 210 may communicate with other devices 211, 212 over a communications media 215 using communications signals 218 via the communications component 240.

In an embodiment, the auto-authentication control component 224 may determine that a mobile device is on a wireless local area network. In an embodiment, the computing device 210 may connect to the internet via an access point.

Figure 3:
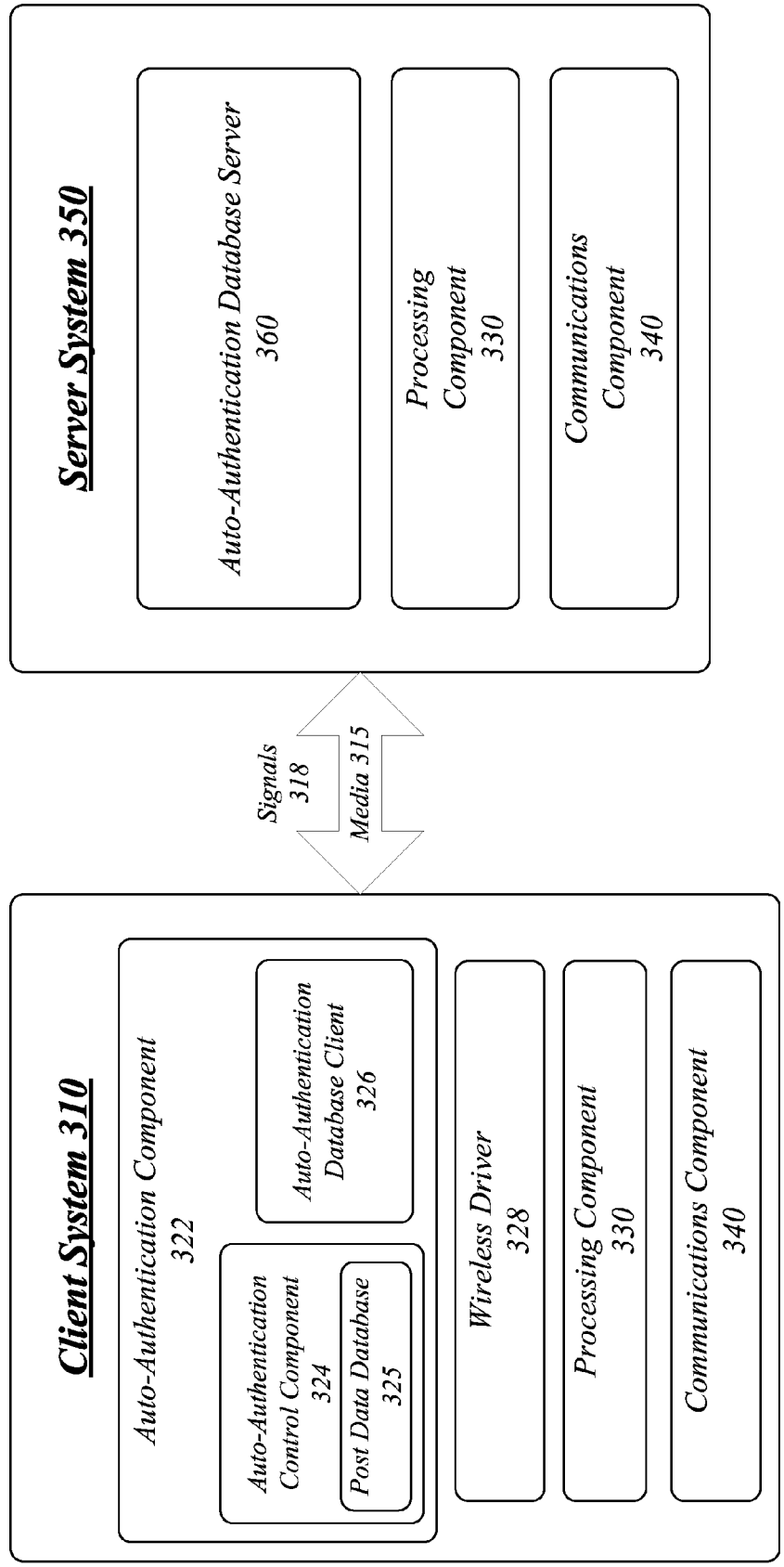
FIG. 3 illustrates a block diagram of a distributed system for the system of FIG. 1.

FIG. 3 illustrates a block diagram of a distributed system 300. The distributed system 300 may distribute portions of the structure and/or operations for the systems 100, 200 across multiple computing entities. Examples of distributed system 300 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The client system 310 and the server system 350 may process information using the processing components 330, which are similar to the processing component 230 described with reference to FIG. 2. The client system 310 and the server system 350 may communicate with each over a communications media 315 using communications signals 318 via communications components 340, which are similar to the communications component 240 described with reference to FIG. 2.

In one embodiment, for example, the distributed system 300 may be implemented as a client-server system. A client system 310 may include, but is not limited to, a mobile device. A client system 310 may include the auto-authentication component 322. The auto-authentication component 322 may include an auto-authentication control component 324 and an auto-authentication database client 326. In an embodiment, the auto-authentication control component 324 may include a post data database 325. In an embodiment, the auto-authentication database client 326 may communicate with the server system 350.

In various embodiments, the server system 350 may comprise or employ one or more server computing devices and/or server programs that operate to perform various methodologies in accordance with the described embodiments. For example, when installed and/or deployed, a server program may support one or more server roles of the server computing device for providing certain services and features. Exemplary server systems 350 may include, for example, stand-alone and enterprise-class server computers operating a server OS such as a MICROSOFT® OS, a UNIX® OS, a LINUX® OS, or other suitable server-based OS. Exemplary server programs may include, for example, communications server programs such as Microsoft® Office Communications Server (OCS) for managing incoming and outgoing messages, messaging server programs such as Microsoft® Exchange Server for providing unified messaging (UM) for e-mail, voicemail, VoIP, instant messaging (IM), group IM, enhanced presence, and audio-video conferencing, and/or other types of programs, applications, or services in accordance with the described embodiments.

In an embodiment, the server system 350 may be stored on an internet cloud. In an embodiment, a server system 350 may comprise an auto-authentication database server component 360. In an embodiment, the auto-authentication database server component 360 may include information, such as, but not limited to, one or more key words, matching thresholds, algorithms, authentication type identification, authentication parameters and authentication status.

The auto-authentication database server component 360 may communicate with the auto-authentication database client 326. In an embodiment, the auto-authentication database client 326 may store the information from the auto-authentication database server component 360.

The auto-authentication database server component 360 may periodically check one or more access points associated with a network access identification for a wireless local area network to ensure that the stored information enables a client system 310 to automatically authenticate. In an embodiment the auto-authentication database server component 360 may determine new information for automatically accessing a wireless local area network when a venue using a particular wireless local area network has changed. When the auto-authentication database server component 360 determines new information, the auto-authentication database server component 360 may communicate the information to the auto-authentication database client 326.

In an embodiment, the auto-authentication database client 326 may periodically update its stored information based on the information in the auto-authentication database server component 360. For example, the auto-authentication database client 326 may be updated once a month, bi-yearly, yearly or other period of time.

In an embodiment, the auto-authentication database client 326 may upload information to the auto-authentication database server component 360. For example, the auto-authentication database client 326 may communicate, through the auto-authentication component 322, with the auto-authentication database server component 360 regarding quality measures and/or any changes to the authentication status. For example, if the auto-authentication component 322 is unable to authenticate using the information in the auto-authentication database client 326, then the auto-authentication component 322 may communicate that the authentication is invalid to the auto-authentication database server component 360. The auto-authentication database server component 360 may update its information.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
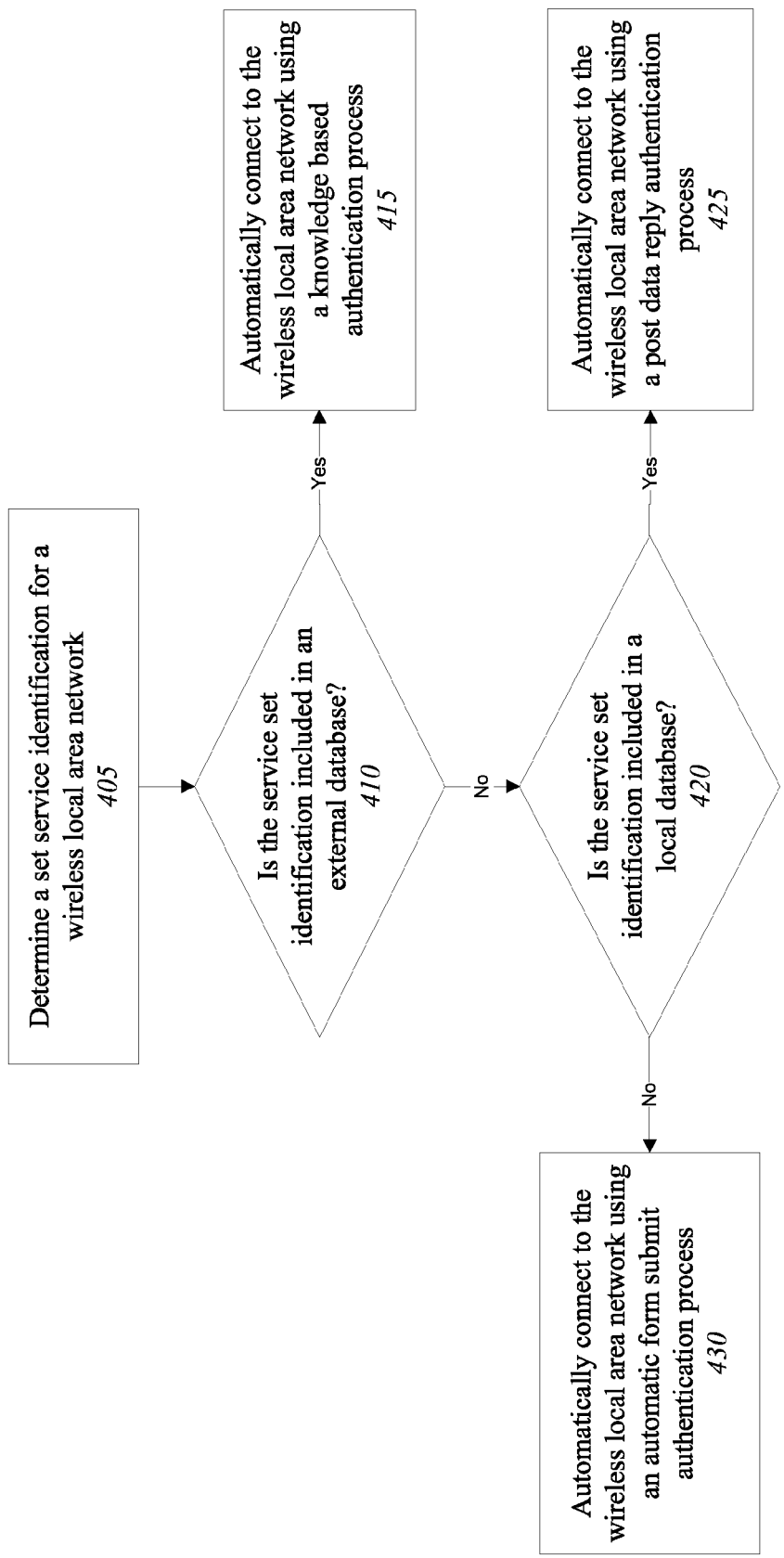
FIG. 4 illustrates an embodiment of a logic flow for the auto-authentication control component.

FIG. 4 illustrates an embodiment of a logic flow 400 for the auto-authentication control component. The logic flow 400 may be representative of some or all of the operations executed by one or more embodiments described herein.

In the illustrated embodiment shown in FIG. 4, the logic flow 400 may determine a set service identification for a wireless local area network at block 405. For example, a wireless driver may determine whether a mobile device is connected to a wireless local area network. Examples of a mobile device may include, without limitation, a personal digital assistant, a mobile computing device, a smart phone, a cellular telephone, a handset, a one-way pager, a two-way pager, a messaging device, a personal computer (PC), a laptop computer, a notebook computer, a handheld computer and a tablet computer. When the auto-authentication control component determines that the mobile device is connected to a wireless local area network, then the auto-authentication control component may determine whether the internet is connected. In an embodiment, the auto-authentication control component may determine whether the internet is connected by opening a public website. If the device can access the public website, then the internet may be connected. If the device cannot access the public website, then the internet may not be connected. In an embodiment, when the internet is not connected, the mobile device may be redirected to an authentication page. In an embodiment, when the internet is not connected, the auto-authentication control component may determine a set service identification for a wireless local area network.

In an embodiment, the auto-authentication control component may connect to the wireless local area network and determine a set service identification for the wireless local area network. In an embodiment, a set service identification may be the supplier of the wireless local area network service. For example, a set service identification for a wireless local area network may be AT&T® WiFi. The embodiments are not limited to this example.

In an embodiment, the logic flow 400 may determine whether the set service identification for the wireless local area network is included in an external database at block 410. In an embodiment, an external database may include the set service identification for the wireless local area network.

In an embodiment, the logic flow 400 may automatically connect with the wireless local area network using knowledge based authentication when the set service identification is included in the external database at block 415. For example, when an external database includes the set service identification, the auto-authentication control component can use knowledge based authentication to automatically authenticate with an access point associated with a network access identification of the wireless local area network. In an embodiment, a priori knowledge of the set service identification of the access point for the wireless local area network may enable the auto-authentication control component to use the knowledge based authentication process.

FIG. 5 discloses a chart with information used in knowledge based authentication. In an embodiment, the access point for a wireless local area network may be identified with a set service identification 505. In an embodiment, the set service identification may be AT&T® WiFi or Verizon® WiFi. The embodiments are not limited to this example.

After determining that the set service identification 505 is included in the database, the auto-authentication control component may determine a unique network access identification 510. In an embodiment, a unique network access identification 510 may be used to differentiate among various access points that have the same set service identification 505. For example, a bunch of different stores may use the set service identification 505 AT&T® WiFi. However, the different stores in various locations may require different types of authentication. For example, Barnes and Noble® may request one type of authentication while Starbucks® may request a different type of authentication. The embodiments are not limited to this example.

In an embodiment, the unique network access identification 510 may be determined by a key word 515 and a matching threshold 520 on an authentication page. For example, a key word 515 may be a particular or specific word and the matching threshold 520 may be the minimum number of times the key word 515 is presented on the authentication page in order to determine the network access identification 510.

In an embodiment, an authentication page may be a webpage that appears when an internet application is opened on the mobile device. In an embodiment, the authentication page may include a landing page. For example, a landing page may be a webpage where a user must accept terms and conditions. A landing page may occur prior to reaching another webpage where the user enters information for authentication.

In an embodiment, after the unique network access identification 510 is determined, an authentication type identification 525 may be determined. An authentication type identification 525 may be used to identify an authentication procedure. In an embodiment, an authentication procedure may be software code that automatically authenticates a mobile device with an access point in a wireless local area network. In an embodiment, the authentication procedure may be the same at one or more environments, venues or locations. The authentication type identification 525 may be a number representing the type of authentication code needed to automatically authenticate a mobile device. For example, the network access identification 1 and the network access identification 4 may use the same authentication procedure, which may be referred to as the $1^{st}$ type of procedure. The network access identification 2 and the network access identification 3 may use the same authentication procedure, which may be referred to as the $2^{nd}$ type of procedure.

In an embodiment, in addition to the authentication type identification 525, one or more authentication parameters 530, 535 may be used. The authentication parameters 530, 535 may enable the auto-authentication control component to work through the procedure automatically. For example, a first authentication parameter 530 may be a sequence number of a link on the first webpage that will lead to the actual webpage for authentication. For example, the network access identification 2 may follow the $2^{nd}$ link on a first webpage to lead to the authentication page. A second authentication parameter 535 may be a name of the field on a webpage that needs to be set in order to authenticate. For example, the network access identification 2 may use the name of the field "AUPConfirmed" for authentication.

In an embodiment, two different locations may have the same authentication type identification 525 or same authentication code, but may use different authentication parameters 530, 535. For example, the network access identification 1 and 4 may have the same authentication type identification 525, but different authentication parameters. For example, the network access identification 1 may follow the $9^{th}$ link on a first webpage to lead to the authentication page while the network access identification 4 may be at the authentication page without needing to follow any links.

In an embodiment, after the authentication procedure is complete, an authentication status 540 may be set in the external database. In an embodiment, in order to complete the authentication procedure, the device may connect to a public website and determine whether the public website opens. In an embodiment, if the public website opens, the internet is working and the authentication procedure was a success. In an embodiment, when the mobile device has been authenticated, the authentication status 540 may indicate success. In an embodiment, when the mobile device cannot open a public website and the mobile device has not been authenticated, the authentication status 540 may indicate failure. In an embodiment, an authentication status 540 of 0 may indicate success and an authentication status 540 of 1 may indicate failure. In an embodiment, if the authentication procedure is a failure, the external database, or the auto-authentication database client may communicate with the auto-authentication database server to determine new and/or updated information for authentication.

Figure 6:
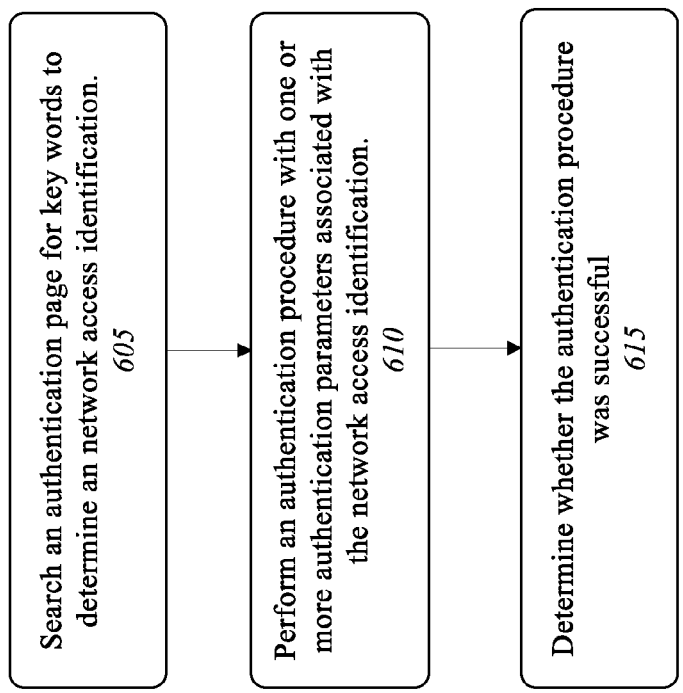
FIG. 6 illustrates an embodiment of a logic flow to connect to a wireless local area network using knowledge based authentication.

FIG. 6 illustrates an embodiment of a logic flow 600 to connect to a wireless local area network using knowledge based authentication. The logic flow 600 may be representative of some or all of the operations executed by one or more embodiments described herein.

In an embodiment, the logic flow 600 may search the authentication page for a key word in order to determine a network access identification at block 605. In an embodiment, a mobile device may open a public website such as www.google.com® and a user may be redirected to an authentication page because the internet is not reachable. In an embodiment, the authentication access control component may search for a key word on an authentication page. In an embodiment, an authentication page may be an authentication webpage which a mobile device is directed to upon opening an application to connect to the internet. In an embodiment, the key word must be located in the content a minimum number of times in order to determine a unique network access identification for the wireless local area network. In an embodiment, a matching threshold may be used to determine the minimum number of times that a key word needs to be located on an authentication page in order to determine the unique network access identification.

In an embodiment, the logic flow 600 may perform an authentication procedure with one or more authentication parameters associated with the network access identification at block 610. In an embodiment, the authentication procedure may include an authentication type identification as well as one or more authentication parameters. In an embodiment, the authentication type identification and the one or more authentication parameters may be determined based on the network access identification.

In an embodiment, the logic flow 600 may determine whether the authentication procedure was successful at block 615. In an embodiment, the auto-authentication control component may determine whether the mobile device can connect to the internet after the authentication procedure is completed. In an embodiment, the auto-authentication control component may determine whether the mobile device can connect to the internet by opening a webpage of a public website. If the mobile device can open the webpage of the public website, then the mobile device may be connected to the internet and an authentication status may indicate that the authentication process was a success.

Referring back FIG. 4, the logic flow 400 may determine whether the set service identification is included in a local database at block 420. In an embodiment, a local database may include post data related to the set service identification. In an embodiment, it may be determined whether post data is available related to the set service identification when the set service identification is not included in the external database at block 420. In an embodiment, post data may be a record stored by the auto-authentication control component in an internal or local database. In an embodiment, post data may be data that was stored after a user manually authenticated into an authentication page that was not included in the external database.

In an embodiment, post data may include static data and dynamic data. Static data may include data that does not change during subsequent authentications. For example, a user may enter his/her e-mail address and/or a password in order to authenticate. The e-mail address and/or password may be static data. Dynamic data may include data that is in a hidden form on the authentication page. Dynamic data may include, but is not limited to, an internet protocol address, a media access control address and/or session cookies. The dynamic data may change every time a user begins the authentication process.

In an embodiment, the logic flow 400 may automatically connect to the wireless local area network using a post data reply authentication process when the data is available which is related to the set service identification at block 425.

In an embodiment, the post data for the post data reply authentication process may be obtained by a user manually entering information and/or accepting terms and conditions the first time a device connects to an access point on the wireless local area network. On subsequent connections, the authentication process may use a combination of previously cached data and new data to automate the post data reply authentication process.

In an embodiment, the first time a user of a mobile device connects to an access point of a wireless local area network, the auto-authentication control component may begin monitoring for post actions. A post action may be an action that a user manually enters. For every post action, the authentication process may check whether the mobile device has internet connectivity. If the mobile device has internet connectivity, the authentication process may deduce that the last captured post data completed the authentication process and therefore should be saved for future authentications.

For example, a post action may be a hypertext transfer protocol (HTTP) post action. In an embodiment, the auto-authentication control component may retrieve a uniform resource locator (URL) from the browser cache which includes the form which was ultimately posted. In an embodiment, the auto-authentication control component may store the post data in the post data database. In an embodiment, the post data database may store a set service identification for the one or more access points for the wireless local area network, a unique network access identifier identifying the supplier and/or operator of the one or more access points, a URL to navigate to obtain the form and post data, e.g., the data that was posted to the web-server to authenticate the mobile device.

Figure 7:
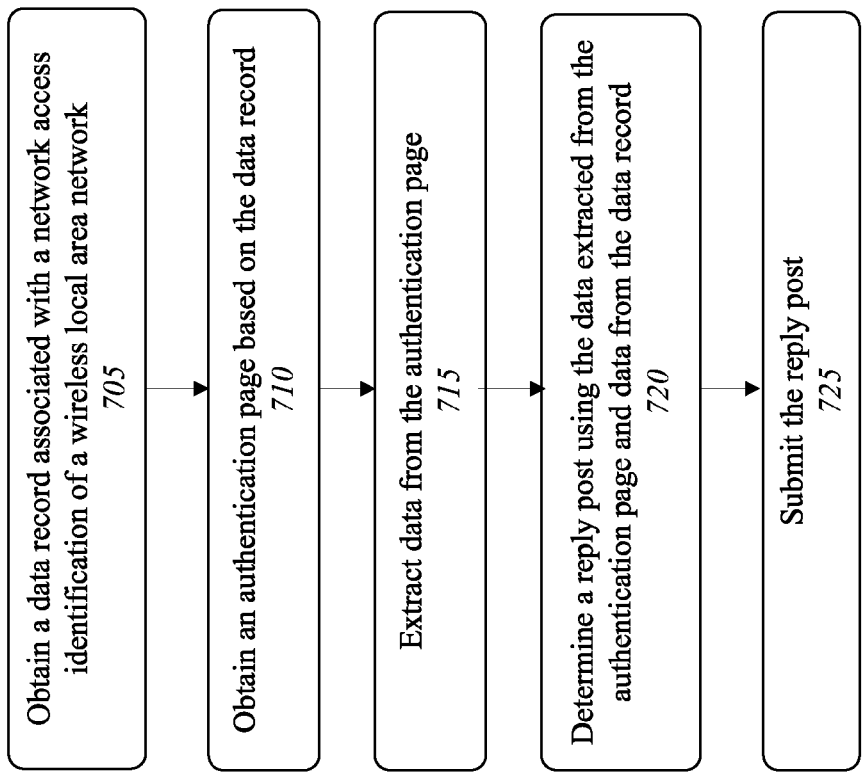
FIG. 7 illustrates an embodiment of a logic flow to connect to a wireless local area network using a post data reply authentication process.

FIG. 7 illustrates an embodiment of a logic flow 700 to connect to a wireless local area network using a post data reply authentication process. The logic flow 700 may be representative of some or all of the operations executed by one or more embodiments described herein.

In the illustrated embodiment shown in FIG. 7, the logic flow 700 may obtain a data record associated with a network access identification of a wireless local area network 705. In an embodiment, a data record may be determined from a device's prior connection to the wireless local area network. In an embodiment, the data record may be stored in a database, table and/or chart local to the auto-authentication control component. In an embodiment, the auto-authentication component may retrieve the data record from a local database. In an embodiment, the retrieved data record may include, but is not limited to, a set service identification, a network access identification, a uniform resource locator address to obtain an authentication page and the post data.

In an embodiment, the logic flow 700 may obtain an authentication page based on the data record at block 710. In an embodiment, a device may open an internet application and navigate directly to an authentication page. In an embodiment, the authentication page may be an authentication website or webpage. In an embodiment, a device may be redirected to an authentication page when a user tries to open a public website using an internet application on the device. For example, a user may try to open the public website www.google.com® and a user may be redirected to an authentication page. In an embodiment, the device may obtain an authentication page using the uniform resource locator stored in the data record.

In an embodiment, the logic flow 700 may extract data from the authentication page at block 715. In an embodiment, the auto-authentication control component may extract form data. Form data may include dynamic data that is present on the authentication page. In an embodiment, form data may be data that is hidden. For example, the dynamic data that is present on the authentication page or form may include, but is not limited to, one or more of an internet protocol address, a media access control (MAC) address and/or session cookies. The dynamic data may be dynamic information that changes every time a device connects to an access point on the wireless local area network. In an embodiment, the dynamic data may be extracted by the auto-authentication control component.

In an embodiment, the logic flow 700 may determine a reply post using data extracted from the authentication page and data from the data record at block 720. In an embodiment, data extracted from the authentication page may be dynamic data. The dynamic data may be used in the reply post.

In an embodiment, data from the data record may be included in the reply post. In an embodiment, the data from the data record may include a cached post. In an embodiment, the data record may include static and dynamic data from the cached post. In an embodiment, a cached post value of uninitialized data may be retained. The cached post value of the uninitialized data may be set to "0" or " ". In an embodiment, the cached post value of the static data may be retained. In an embodiment, the static data may include, but is not limited to, one or more of a username, an email or a password a user previously used in order to authenticate. In an embodiment, the static data from the data record may be included in the reply post in addition to the dynamic data from the authentication page.

In an embodiment, the logic flow 700 may submit the reply post at block 720. In an embodiment, when the reply post is submitted, the device may be automatically authenticated.

Figure 8:
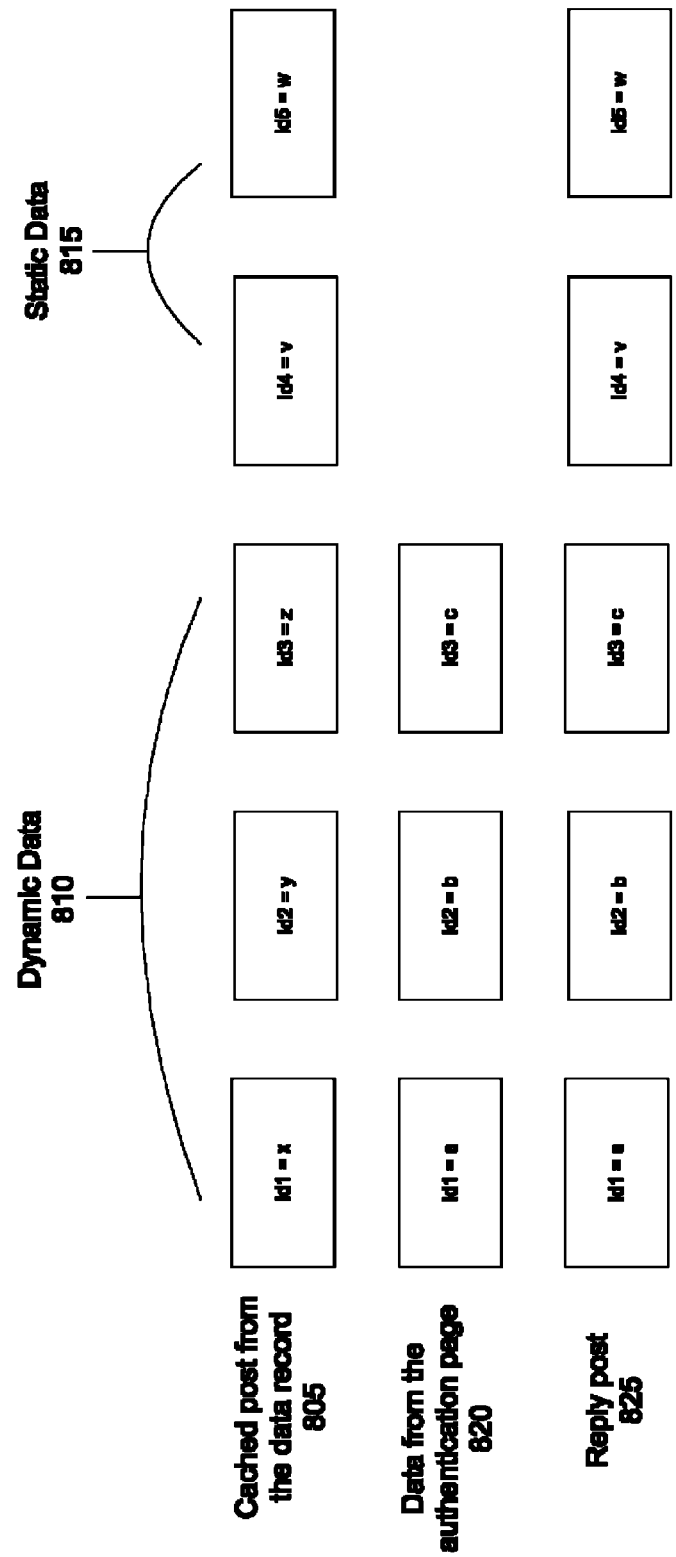
FIG. 8 illustrates an example of a cached post from the data record, data extracted from an authentication page and a reply post.

FIG. 8 illustrates an example of a cached post from the data record 805, data extracted from an authentication page 820 and a reply post 825. The cached post from the data record 805 may be obtained the first time a user of the device manually authenticates with the authentication page. The cached post 805 may include dynamic data 810 and static data 815.

The data from an authentication page 820 may include the most recent post data that was extracted. In an embodiment, the data extracted from the authentication page 820 may include dynamic data 810.

In an embodiment, the reply post 825 may include the final post data submitted for completing the authentication process. In an embodiment, the reply post 825 may include the dynamic data 810 from the most recent post data on the authentication page and the static data 815 from the cached post in the data record.

Referring back to FIG. 4, the logic flow 400 may automatically connect to the wireless local area network using automatic form submit authentication when the data is not available which is related to the set service identification at block 430. In an embodiment, the set service identification may not be recognized. In an embodiment, the set service identification may not be recognized because the set service identification is not in the external data base. In an embodiment, the set service identification may not be recognized because the user did not previously manually authenticate and so the set service identification is not included in the local database. When the set service identification is not recognized, the auto-authentication control component may use an automatic form submit procedure to try to authenticate with an access point. In an embodiment, this process uses only the information included on a webpage. In an embodiment, in order to authenticate using the automatic form submit procedure all the information to authenticate must be on the webpage. In an embodiment, the webpage may be the landing page of the captive portal or the page at which the internet address opens or is automatically directed to.

Figure 9:
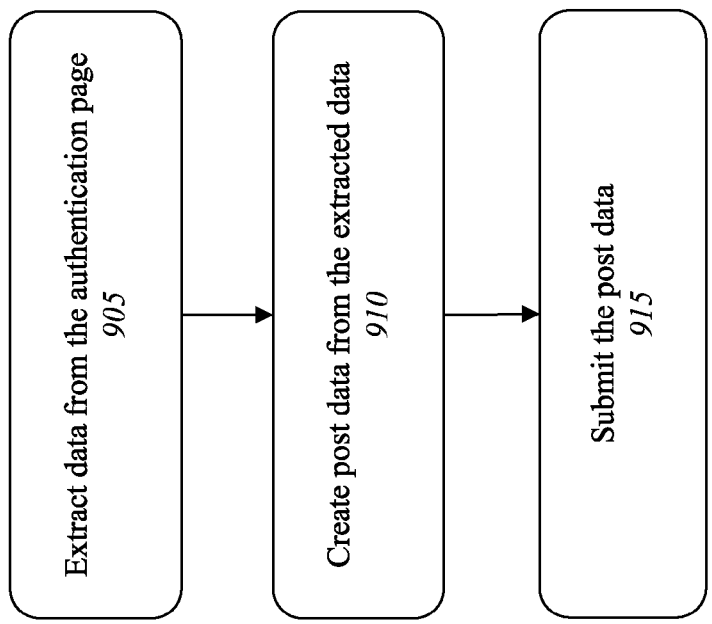
FIG. 9 illustrates an embodiment of a logic flow to connect to a wireless local area network using an automatic form submit authentication process.

FIG. 9 illustrates an embodiment of a logic flow 900 to connect to a wireless local area network using an automatic form submit authentication process. The logic flow 900 may be representative of some or all of the operations executed by one or more embodiments described herein.

In the illustrated embodiment shown in FIG. 9, the logic flow 900 may extract data from the authentication page at block 905. In an embodiment, the auto-authentication control component may extract one or more input fields from the authentication page. In an embodiment, the authentication page may be a hypertext markup language (HTML) document.

In an embodiment, the logic flow 900 may create post data from the extracted data at block 910. In an embodiment, the auto-authentication control component may create post data in the standard notation described above. In an embodiment, the auto-authentication control component may create post data from dynamic data associated with the authentication page.

In an embodiment, the logic flow 900 may submit the post data at block 915. In an embodiment, the auto-authentication control component may use an action URL to submit the post data.

In an embodiment, the submitted post data may allow the device to authenticate. In an embodiment, the submitted post data may be insufficient in allowing the device to authenticate. If the submitted post data is insufficient, then a user may have to manually authenticate the device. When the user manually authenticates the device, the post data for the post data reply authentication process may be obtained. On subsequent connections, the authentication process may use a combination of previously cached data and new data to automate the post data reply authentication process.

Figure 10:
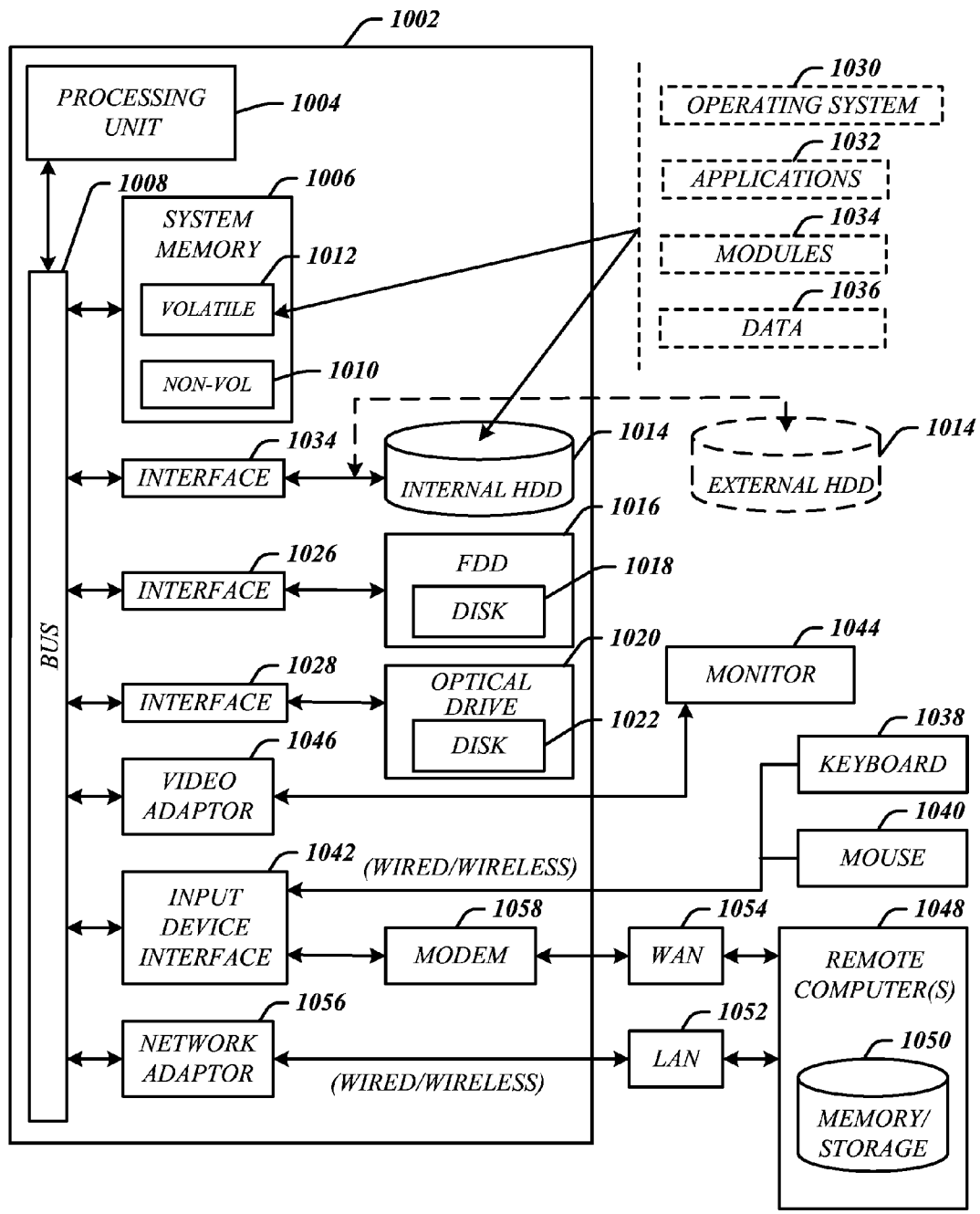
FIG. 10 illustrates an embodiment of a computing architecture.

FIG. 10 illustrates an embodiment of an exemplary computing architecture 700 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1000 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a hand-held computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1000 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors. Dual microprocessors and other multi-processor architectures may also be employed as the processing unit 1004. The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures.

The computing architecture 1000 may comprise or implement various articles of manufacture. An article of manufacture may comprise a computer-readable storage medium to store logic. Embodiments may also be at least partly implemented as instructions contained in or on a non-transitory computer-readable medium, which may be read and executed by one or more processors to enable performance of the operations described herein. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036.

The one or more application programs 1032, other program modules 1034, and program data 1036 can include, for example, the auto-authentication component 122 and the auto-authentication control component 124.

A user can enter commands and information into the computer 1002 through one or more wire/wireless input devices, for example, a keyboard 1038 and a pointing device, such as a mouse 1040. Other input devices may include a microphone, an infrared (IR) remote control, a joystick, a game pad, a stylus pen, touch screen, or the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
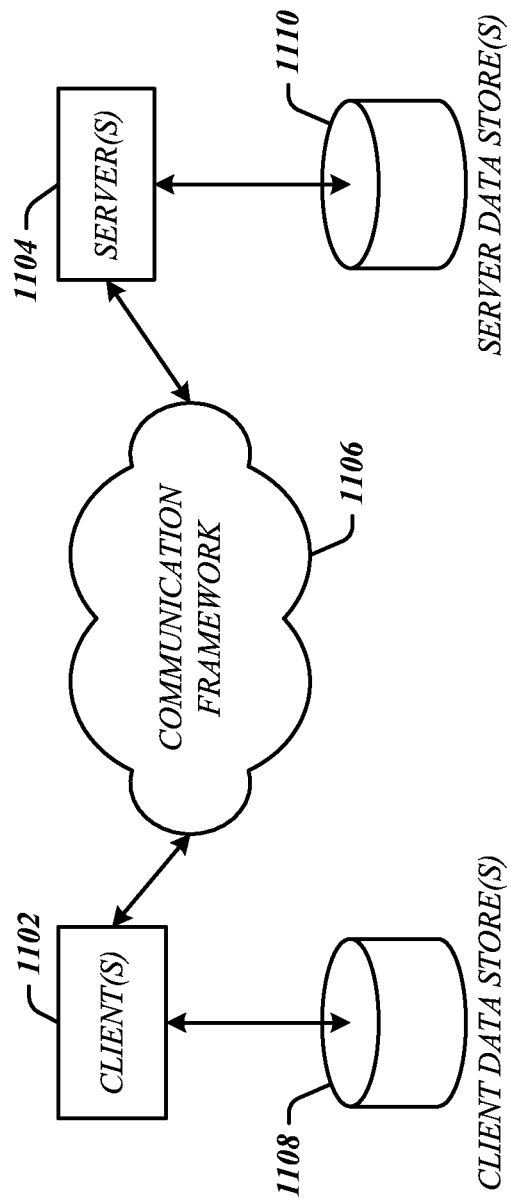
FIG. 11 illustrates an embodiment of a communications architecture.

FIG. 11 illustrates a block diagram of an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, and so forth. The embodiments, however, are not limited to implementation by the communications architecture 1100.

As shown in FIG. 11, the communications architecture 1100 comprises includes one or more clients 1102 and servers 1104. The clients 1102 may implement the client systems 210, 310. The servers 1104 may implement the server system 350. The clients 1102 and the servers 1104 are operatively connected to one or more respective client data stores 1108 and server data stores 1110 that can be employed to store information local to the respective clients 1102 and servers 1104, such as cookies and/or associated contextual information.

The clients 1102 and the servers 1104 may communicate information between each other using a communication framework 1106. The communications framework 1106 may implement any well-known communications techniques and protocols, such as those described with reference to systems 200, 300 and 1000. The communications framework 1106 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An article of manufacture comprising a non-transitory storage medium containing instructions that when executed cause a system to:

determine that a mobile device is on a wireless local area network;

obtain an authentication page associated with a network access identification for the wireless location area network;

search the authentication page for one or more key words corresponding to a set service identification;

determine the network access identification for the wireless local area network based on the one or more key words appearing in the authentication page a number of times greater than a matching threshold; and automatically authenticate the mobile device on the wireless local area network based on information associated with the network access identification.

2. The article of manufacture of claim 1, comprising instructions that when executed cause the system to:
determine that an external database includes the set service identification.

3. The article of manufacture of claim 1, comprising instructions that when executed cause the system to perform an authentication procedure using one or more authentication parameters associated with the network access identification to automatically authenticate the mobile device.

4. The article of manufacture of claim 1, comprising instructions that when executed cause the system to output an authentication status to an external database.

5. The article of manufacture of claim 1, comprising instructions that when executed cause the system to:
determine that a local database includes the set service identification of the wireless local area network; and
determine a data record in the local database for the wireless local area network based on the network access identification.

6. The article of manufacture of claim 1, comprising instructions that when executed cause the system to determine a data record based on the network access identification, the data record to include the network access identification, a set service identification, and cached post data.

7. The article of manufacture of claim 1, comprising instructions that when executed cause the system to:
obtain an authentication page associated with the network access identification; and
extract dynamic data from the authentication page.

8. The article of manufacture of claim 1, comprising instructions that when executed cause the system to:
obtain stored static data from a data record associated with the network access identification; and
submit a reply post with dynamic data and the stored static data to automatically authenticate the mobile device.

9. The article of manufacture of claim 1, comprising instructions that when executed cause the system to:
extract data from the authentication page associated with the wireless local area network when the set service identification of the wireless local area network is not identified in one or more databases;
create a post data from the extracted data; and
submit the post data to automatically authenticate.

10. A method, comprising:
determining that a mobile device is on a wireless local area network;
obtaining a set service identification;
obtaining an authentication page associated with a network access identification for the wireless location area network;
searching the authentication page for one or more key words corresponding to the set service identification;
determining an unique network access identification for the wireless local area network using the set service identification network and based on the one or more key words appearing in the authentication page a number of times greater than a matching threshold; and
automatically authenticating the mobile device on the wireless local area network based on information associated with the network access identification.

11. The method of claim 10, comprising:
determining that an external database includes the set service identification.

12. The method of claim 10, comprising:
performing an authentication procedure using one or more authentication parameters associated with the network access identification to automatically authenticate the mobile device.

13. The method of claim 10, comprising:
outputting an authentication status to an external database.

14. The method of claim 10, comprising:
determining that a local database includes the set service identification of the wireless local area network; and
determining a data record in the local database for the wireless local area network based on the network access identification.

15. The method of claim 10, comprising:
determining a data record based on the network access identification, the data record to include the network access identification, the set service identification, and cached post data.

16. The method of claim 10, comprising:
obtaining an authentication page associated with the network access identification; and
extracting dynamic data from the authentication page.

17. The method of claim 10, comprising:
obtaining stored static data from a data record associated with the network access identification;
submitting a reply post with dynamic data and the stored static data to automatically authenticate the mobile device.

18. The method of claim 10, comprising:
extracting data from the authentication page associated with the wireless local area network when the set service identification of the wireless local area network is not identified in one or more databases;
creating a post data from the extracted data; and
submitting the post data to automatically authenticate.

19. An apparatus, comprising:
a processing unit; and
an auto-authentication component operative on the processing unit, the auto-authentication module comprising:
an auto-authentication control component operative to:
determine that the apparatus is on a wireless local area network;
obtain an authentication page associated with a network access identification for the wireless location area network;
search the authentication page for one or more key words corresponding to a set service identification;
determine the network access identification for the wireless local area network based on the one or more key words appearing in the authentication page a number of times greater than a matching threshold; and
automatically authenticate the apparatus on the wireless local area network based on information associated with the network access identification.

20. The apparatus of claim 19, the auto-authentication control component operative to perform a knowledge based authentication process, the auto-authentication control component to:
determine that an external database includes the set service identification.

21. The apparatus of claim 19, the auto-authentication control component operative to perform a knowledge based authentication process, the auto-authentication control component to:

perform an authentication procedure using one or more authentication parameters associated with the network access identification to automatically authenticate the apparatus.

22. The apparatus of claim 19, the auto-authentication control component operative to perform a knowledge based authentication process, the auto-authentication control component to:
output an authentication status to an external database.

23. The apparatus of claim 19, the auto-authentication control component operative to perform a post data reply authentication process, the auto-authentication control component to:
determine that a local database includes the set service identification of the wireless local area network; and
determine a data record in the local database for the wireless local area network based on the network access identification.

24. The apparatus of claim 19, the auto-authentication control component operative to perform a post data reply authentication process, the auto-authentication control component to:
determine a data record based on the network access identification, the data record to include the network access identification, the set service identification, and cached post data.

25. The apparatus of claim 19, the auto-authentication control component operative to perform a post data reply authentication process, the auto-authentication control component to:
obtain the authentication page associated with the network access identification; and
extract dynamic data from the authentication page.

26. The apparatus of claim 19, the auto-authentication control component operative to perform a post data reply authentication process, the auto-authentication control component to:
obtain stored static data from a data record associated with the network access identification; and
submit a reply post with dynamic data and the stored static data to automatically authenticate the apparatus.

27. The apparatus of claim 19, the auto-authentication control component operative to perform an automatic form submit authentication process, the auto-authentication control component to:
extract data from the authentication page associated with the wireless local area network when the set service identification of the wireless local area network is not identified in one or more databases;
create a post data from the extracted data; and
submit the post data to automatically authenticate.

28. The apparatus of claim 19, comprising:
a digital display communicatively coupled to the processing unit.

29. The apparatus of claim 19, comprising:
a transceiver communicatively coupled to the processing unit.

30. The apparatus of claim 19, comprising:
an antenna communicatively coupled to the processing unit.

* * * * *